(12) United States Patent
Cui et al.

(10) Patent No.: US 9,846,626 B2
(45) Date of Patent: Dec. 19, 2017

(54) METHOD AND APPARATUS FOR COMPUTER MEMORY MANAGEMENT BY MONITORING FREQUENCY OF PROCESS ACCESS

(71) Applicant: Huawei Technologies Co., Ltd., Shenzhen (CN)

(72) Inventors: Zehan Cui, Beijing (CN); Mingyu Chen, Beijing (CN); Licheng Chen, Beijing (CN); Mingyang Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 31 days.

(21) Appl. No.: 14/754,011

(22) Filed: Jun. 29, 2015

(65) Prior Publication Data

US 2015/0301917 A1    Oct. 22, 2015

Related U.S. Application Data

(63) Continuation of application No. PCT/CN2013/083702, filed on Sep. 18, 2013.

(30) Foreign Application Priority Data

Dec. 31, 2012    (CN) .......................... 2012 1 0591865

(51) Int. Cl.
*G06F 13/00*    (2006.01)
*G06F 11/30*    (2006.01)
(Continued)

(52) U.S. Cl.
CPC ...... *G06F 11/3037* (2013.01); *G06F 11/3027* (2013.01); *G06F 12/10* (2013.01);
(Continued)

(58) Field of Classification Search
CPC .. G06F 11/3037; G06F 12/10; G06F 11/3027; G06F 13/1663; G06F 12/12;
(Continued)

(56) References Cited

U.S. PATENT DOCUMENTS 6,035,377 A    3/2000 James et al.
6,282,613 B1   8/2001 Hsu et al.
(Continued)

FOREIGN PATENT DOCUMENTS

CN    1828550 A    9/2006
CN    101093456 A    12/2007
(Continued)

OTHER PUBLICATIONS

Foreign Communication From a Counterpart Application, European Application No. 13866748.0, Extended European Search Report dated Mar. 22, 2016, 8 pages.
(Continued)

*Primary Examiner* — Hong Kim
(74) *Attorney, Agent, or Firm* — Conley Rose, P.C.

(57) ABSTRACT

A memory monitoring method and a computing system. The computing system includes a processor, a memory and a monitor. The monitor obtains memory unit access information and process information of the computer system. The memory unit access information includes the number of access times of each memory unit of the memory. The process information includes information about a mapping relationship between a virtual address and a physical address of each memory units accessed by the current running process. After generating monitoring information, which includes the frequency at which the current running process accesses each memory unit, according to the memory unit access information and the process information, the monitor feeds the monitoring information back to the processor.

(Continued)

Thus, the processor can perform memory management according to the monitoring information.

14 Claims, 3 Drawing Sheets

(51) Int. Cl.
    *G06F 13/16*     (2006.01)
    *G06F 12/10*     (2016.01)
    *G06F 11/34*     (2006.01)
    *G06F 12/12*     (2016.01)

(52) U.S. Cl.
    CPC ...... *G06F 13/1663* (2013.01); *G06F 11/3452* (2013.01); *G06F 11/3466* (2013.01); *G06F 12/12* (2013.01); *G06F 2201/815* (2013.01); *G06F 2201/88* (2013.01)

(58) Field of Classification Search
    CPC ........... G06F 2201/88; G06F 2201/815; G06F 11/3466; G06F 11/3452
    USPC .................................................. 711/154, 158
    See application file for complete search history.

(56) References Cited

U.S. PATENT DOCUMENTS

| | | |
|---|---|---|
| 2007/0124540 A1 | 5/2007 | Van Riel |
| 2007/0300231 A1 | 12/2007 | Aguilar et al. |
| 2008/0320194 A1* | 12/2008 | Vega ..................... G06F 9/4812 710/263 |
| 2011/0271070 A1 | 11/2011 | Worthington et al. |
| 2012/0023300 A1 | 1/2012 | Tremaine et al. |
| 2012/0272029 A1* | 10/2012 | Zhang ................ G06F 11/3466 711/165 |
| 2014/0006874 A1* | 1/2014 | Bohling .............. G06F 11/3476 714/45 |
| 2014/0237192 A1 | 8/2014 | Liu et al. |

FOREIGN PATENT DOCUMENTS

| | | |
|---|---|---|
| CN | 101604283 A | 12/2009 |
| CN | 101908018 A | 12/2010 |
| CN | 102063363 A | 5/2011 |
| CN | 102439577 A | 5/2012 |

OTHER PUBLICATIONS

Partial English Translation and Abstract of Chinese Patent Application No. CN1828550A, Aug. 31, 2015, 15 pages.

Foreign Communication From a Counterpart Application, PCT Application No. PCT/CN2013/083702, English Translation of International Search Report dated Dec. 26, 2013, 2 pages.

Foreign Communication From a Counterpart Application, PCT Application No. PCT/CN2013/083702, English Translation of Written Opinion dated Dec. 26, 2013, 6 pages.

* cited by examiner

US 9,846,626 B2

METHOD AND APPARATUS FOR COMPUTER MEMORY MANAGEMENT BY MONITORING FREQUENCY OF PROCESS ACCESS

CROSS-REFERENCE TO RELATED APPLICATION

This application is a continuation of International Application No. PCT/CN2013/083702, filed on Sep. 18, 2013, which claims priority to Chinese Patent Application No. 201210591865.0, filed on Dec. 31, 2012, both of which are hereby incorporated by reference in their entireties.

TECHNICAL FIELD

The present invention relates to the field of computers, and in particular, to a memory monitoring method and a related apparatus.

BACKGROUND

Memory management is an important factor affecting system performance. A memory management module in an existing computer system is mainly responsible for allocation, recycling, swap-in, and swap-out of memory units. "Allocation" refers to selecting, by a memory management module, a suitable memory unit from an idle memory unit list and allocating the memory unit to a process when the process applies for a memory unit to the computer system. "Recycling" refers to, when a memory unit is released by a process, placing, by a memory management module, the released memory unit back to the idle memory unit list and performing appropriate defragmentation. "Swap-out" refers to, when a physical memory is insufficient, storing, by a memory management module, process data or process code that is not urgent to an external storage (a disk or the like), so that a memory unit occupied by the process data or the process code is released to be used by an urgent process or used by the computer system. "Swap-in" refers to writing, by a memory management module, swapped-out process data or code, when necessary, back to a memory unit which has already become idle.

Currently, a real-time factor is considered to some extent during "swap-out". For example, in a case in which hardware supports reference bit (RB), a usual practice is that a computer system regularly resets reference bits of all memory units; and if a memory unit is accessed within a period, the reference bit of the memory unit is set to one. In this way, before the computer system resets the reference bit next time, if the reference bit is 1, it indicates that the memory unit was accessed in a previous period. When a memory unit is selected for swap-out, a memory unit whose reference bit is 0, that is, a memory unit not accessed in a previous period, is preferentially considered. However, considering performance overheads caused by resetting the reference bits of all memory units, a period for resetting the reference bits is relatively long, resulting in poor real-time quality. In addition, one access and 1000 accesses have the same manifestation, which cannot reflect true access frequency of a memory unit. After memory unit that are not accessed are all swapped out, that is, when all reference bits are 1, memory units to be swapped out can only be selected randomly. In this case, if the swapped-out memory units are frequently accessed, execution efficiency of the computer system is affected to some extent, and the execution efficiency of the computer system is reduced.

SUMMARY

Embodiments of the present invention provide a memory monitoring method and a related apparatus, which are used to improve execution efficiency of a computer system.

The embodiments of the present invention provide the following technical solutions.

A first aspect of the present invention provides a memory monitoring method, including: obtaining memory unit access information of a computer system, where the memory unit access information includes the number of access times of each memory unit of the computer system; obtaining process information of the computer system, where the process information includes information about a mapping relationship between a virtual address and a physical address of a current running process of the computer system; generating monitoring information according to the memory unit access information and the process information, where the monitoring information includes frequency at which the current running process of the computer system accesses each memory unit; and feeding the monitoring information back to the computer system, so that the computer system performs memory management according to the monitoring information.

Based on the first aspect of the present invention, in a first possible implementation manner, the obtaining memory unit access information of a computer system is listening on a memory bus of the computer system to obtain the memory unit access information of the computer system.

Based on the first possible implementation manner of the first aspect of the present invention, in a second possible implementation manner, the listening on a memory bus of the computer system is performing bypass listening on the memory bus of the computer system.

Based on the first aspect of the present invention, the first possible implementation manner of the first aspect of the present invention, or the second possible implementation manner of the first aspect of the present invention, in a third possible implementation manner, the obtaining process information of the computer system includes detecting a special memory access address of the computer system; and decoding the detected special memory access address to obtain the process information of the computer system, where the special memory access address is generated by the computer system by encoding the process information.

Based on the first aspect of the present invention, the first possible implementation manner of the first aspect of the present invention, the second possible implementation manner of the first aspect of the present invention, or the third possible implementation manner of the first aspect of the present invention, in a fourth possible implementation manner, the monitoring information further includes statistics information, and the generating monitoring information according to the memory unit access information and the process information includes generating, according to the number of access times of each memory unit of the computer system and the process information, the frequency at which the current running process of the computer system accesses each memory unit; and classifying the number of access times of each memory unit of the computer system into the number of access times of one or more of a Bank, a Rank, a memory module, and a memory channel, so as to obtain the statistics information, where the statistics information includes the number of access times of one or more of the Bank, the Rank, the memory module, and the memory channel.

Based on the first aspect of the present invention, the first possible implementation manner of the first aspect of the present invention, the second possible implementation manner of the first aspect of the present invention, the third possible implementation manner of the first aspect of the present invention, or the fourth possible implementation manner of the first aspect of the present invention, in a fifth possible implementation manner, the feeding the monitoring information back to the computer system includes storing the monitoring information into a buffer created in advance in the computer system; and updating a memory status bit of the computer system, so that the computer system learns that the monitoring information has been stored into the buffer.

Based on the first aspect of the present invention, the first possible implementation manner of the first aspect of the present invention, the second possible implementation manner of the first aspect of the present invention, the third possible implementation manner of the first aspect of the present invention, or the fourth possible implementation manner of the first aspect of the present invention, in a sixth possible implementation manner, before the feeding the monitoring information back to the computer system, the method includes receiving, from the computer system, a command to obtain the monitoring information; and the feeding the monitoring information back to the computer system is, after receiving, from the computer system, the command to obtain the monitoring information, feeding the monitoring information back to the computer system.

Based on the first aspect of the present invention, the first possible implementation manner of the first aspect of the present invention, the second possible implementation manner of the first aspect of the present invention, the third possible implementation manner of the first aspect of the present invention, the fourth possible implementation manner of the first aspect of the present invention, the fifth possible implementation manner of the first aspect of the present invention, or the sixth possible implementation manner of the first aspect of the present invention, in a seventh possible implementation manner, the memory unit access information further includes a reuse distance of each memory unit of the computer system; and after the obtaining memory unit access information of a computer system, the method further includes feeding the reuse distance of each memory unit of the computer system back to the computer system.

A second aspect of the present invention provides a memory monitoring apparatus, including: a first obtaining unit, configured to obtain memory unit access information of a computer system, where the memory unit access information includes the number of access times of each memory unit of the computer system; a second obtaining unit, configured to obtain process information of the computer system, where the process information includes information about a mapping relationship between a virtual address and a physical address of a current running process of the computer system; a generating unit, connected to the first obtaining unit and the second obtaining unit, and configured to generate monitoring information according to the memory unit access information obtained by the first obtaining unit and the process information obtained by the second obtaining unit, where the monitoring information includes frequency at which the current running process of the computer system accesses each memory unit; and a feedback unit, connected to the generating unit, and configured to feed the monitoring information generated by the generating unit back to the computer system, so that the computer system performs memory management according to the monitoring information.

Based on the second aspect of the present invention, in a first possible implementation manner, the first obtaining unit is configured to listen on a memory bus of the computer system to obtain the memory unit access information of the computer system.

Based on the first possible implementation manner of the second aspect of the present invention, in a second possible implementation manner, the first obtaining unit is configured to perform bypass listening on the memory bus of the computer system to obtain the memory unit access information of the computer system.

Based on the second aspect of the present invention, the first possible implementation manner of the second aspect of the present invention, or the second possible implementation manner of the second aspect of the present invention, in a third possible implementation manner: the second obtaining unit includes: a detection unit, configured to detect a special memory access address of the computer system; and a decoding and obtaining unit, configured to decode the special memory access address detected by the detection unit to obtain the process information of the computer system, where the special memory access address is generated by the computer system by encoding the process information.

Based on the second aspect of the present invention, the first possible implementation manner of the second aspect of the present invention, the second possible implementation manner of the second aspect of the present invention, or the third possible implementation manner of the second aspect of the present invention, in a fourth possible implementation manner, the monitoring information further includes statistics information, and the generating unit is configured to generate, according to the number of access times of each memory unit of the computer system obtained by the first obtaining unit and the process information obtained by the second obtaining unit, the frequency at which the current running process of the computer system accesses each memory unit; and classify the number of access times of each memory unit of the computer system obtained by the first obtaining unit into the number of access times of one or more of a Bank, a Rank, a memory module, and a memory channel, so as to obtain the statistics information, where the statistics information includes the number of access times of one or more of the Bank, the Rank, the memory module, and the memory channel.

Based on the second aspect of the present invention, the first possible implementation manner of the second aspect of the present invention, the second possible implementation manner of the second aspect of the present invention, the third possible implementation manner of the second aspect of the present invention, or the fourth possible implementation manner of the second aspect of the present invention, in a fifth possible implementation manner, the feedback unit includes a buffer unit configured to store the monitoring information generated by the generating unit into a buffer created in advance in the computer system; and an update unit configured to update a memory status bit of the computer system, so that the computer system learns that the monitoring information has been stored into the buffer.

Based on the second aspect of the present invention, the first possible implementation manner of the second aspect of the present invention, the second possible implementation manner of the second aspect of the present invention, the third possible implementation manner of the second aspect of the present invention, or the fourth possible implementation manner of the second aspect of the present invention, in a sixth possible implementation manner, the memory monitoring apparatus further includes: a receiving unit, configured to receive, from the computer system, a command to obtain the monitoring information; and the feedback unit is configured to, after the receiving unit receives, from the computer system, the command to obtain the monitoring information, feed the monitoring information back to the computer system.

Based on the second aspect of the present invention, the first possible implementation manner of the second aspect of the present invention, the second possible implementation manner of the second aspect of the present invention, the third possible implementation manner of the second aspect of the present invention, the fourth possible implementation manner of the second aspect of the present invention, the fifth possible implementation manner of the second aspect of the present invention, or the sixth possible implementation manner of the second aspect of the present invention, in a seventh possible implementation manner, the memory unit access information obtained by the first obtaining unit further includes a reuse distance of each memory unit of the computer system; and the feedback unit is further configured to feed the reuse distance of each memory unit of the computer system obtained by the first obtaining unit back to the computer system.

It can be seen from the foregoing that, in the embodiments of the present invention, memory unit access information and process information of a computer system are obtained to extract frequency at which a current running process of the computer system accesses each memory unit, and monitoring information including the frequency at which the current running process of the computer system accesses each memory unit is generated and fed back to the computer system, so that the computer system can perform memory management according to the frequency at which the process accesses the memory unit and which is included in the monitoring information, and execution efficiency of the computer system can be greatly improved.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely drawings in some embodiments of the present invention.

DESCRIPTION OF EMBODIMENTS

Embodiments of the present invention provide a memory monitoring method and a related apparatus.

To make the invention objectives, features, and advantages of the present invention clearer and more comprehensible, the following clearly and completely describes the technical solutions in the embodiments of the present invention with reference to the accompanying drawings in the embodiments of the present invention. The embodiments described are merely a part rather than all of the embodiments of the present invention.

Figure 1:
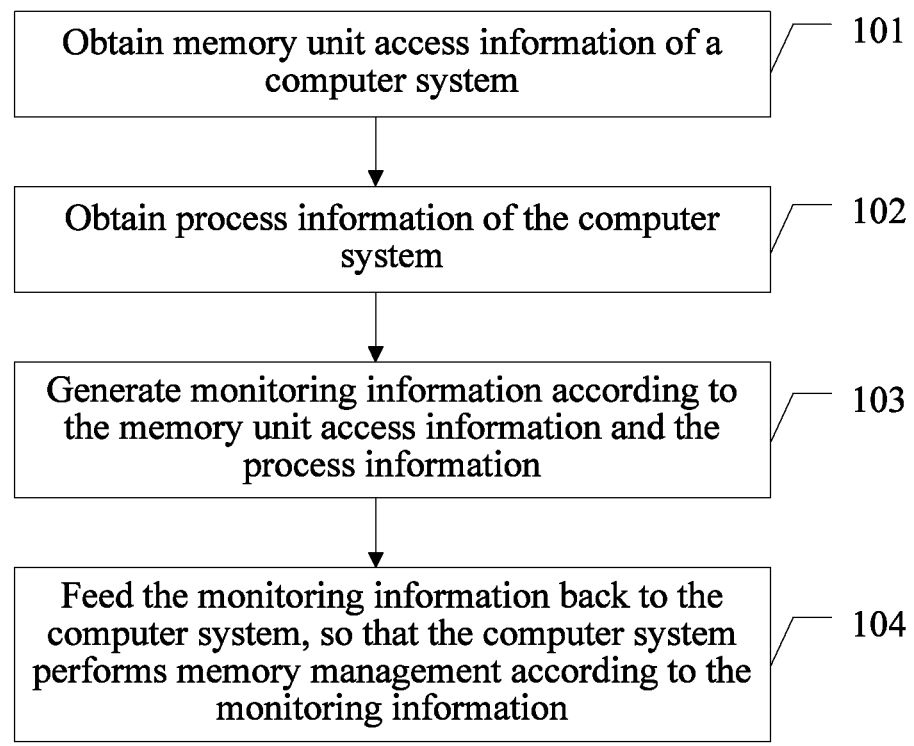
FIG. 1 is a schematic flowchart of an embodiment of a memory monitoring method provided by the embodiments of the present invention.

A memory monitoring method provided in an embodiment of the present invention is described below. Referring to FIG. 1, the memory monitoring method in the embodiment of the present invention includes:

101: Obtain memory unit access information of a computer system.

The memory unit access information includes the number of access times of each memory unit of the computer system. Further, the memory unit access information may include a reuse distance of each memory unit of the computer system. In the embodiment of the present invention, two counters are maintained for each memory unit, where one counter is configured to calculate the number of access times of the memory unit (for the convenience of distinction, this counter is referred to as a first counter), and the other counter is configured to calculate a reuse distance of the memory unit (for the convenience of distinction, this counter is referred to as a second counter). For the number of access times of a memory unit, when an access address belongs to the memory unit, the first counter maintained for the memory unit is incremented by 1, and therefore, the number of access times of the memory unit is a value of the first counter maintained for the memory unit. The reuse distance refers to the number of access times of another memory unit within an interval between two accesses to a same memory unit. When an access address does not belong to the memory unit, the second counter maintained for the memory unit is incremented by 1; and when an access address belongs to the memory unit, the second counter is reset, where a value before the reset is a reuse distance of the memory unit.

In the embodiment of the present invention, the memory monitoring apparatus may obtain the memory unit access information of the computer system by listening on a memory bus of the computer system, and certainly, the memory unit access information of the computer system may also be obtained by another external device and sent to the memory monitoring apparatus, which is not limited herein. That the memory monitoring apparatus obtains the memory unit access information of the computer system by listening on the memory bus of the computer system may be implemented in the following two manners. In one implementation manner, the memory monitoring apparatus is connected to an extended command and address bus of the memory bus, so that the memory monitoring apparatus can perform bypass listening on the command and address bus to obtain an access situation of each memory unit (for example, the number of access times and the reuse distance of each memory unit) of the computer system, so as to obtain the memory unit access information of the computer system. In another implementation manner, the memory unit access information of the computer system is obtained in a non-bypass-listening manner, that is, the memory monitoring apparatus is connected to the memory bus in series, and then all memory access operations of the computer system go through the memory monitoring apparatus; therefore, the memory monitoring apparatus can collect statistics about information such as the number of access times and the reuse distance of each memory unit, so as to obtain the memory unit access information of the computer system.

102: Obtain process information of the computer system.

The process information includes information about a mapping relationship between a virtual address and a physical address of a current running process of the computer system (that is, a process running in the computer system).

In an implementation manner, the computer system may encode the process information to generate a special memory access address, where the special memory access address cannot be accessed by an application program, but can only be recognized and accessed by the memory monitoring apparatus. For example, the computer system and the memory monitoring apparatus may agree that some bits (which are assumed to be the first bit and the second bit) of a memory access address are used as flag bits of the special memory access address, and agree on a specific identifier. The computer system encodes the process information to generate the special memory access address, where the first bit and the second bit of the special memory access address are the specific identifier, and remaining bits are encoded data obtained after the computer system encodes the process information. The memory monitoring apparatus detects a memory access address of the computer system in real time, and when detecting that the first bit and the second bit of a memory access address are the specific identifier, determines that the memory access address is the special memory access address including the encoded data of the process information; and the memory monitoring apparatus decodes the detected special memory access address to obtain the process information.

In another implementation manner, if the memory monitoring apparatus is connected to the memory bus of the computer system in series, a part of an address space of the computer system may be allocated to a storage on the memory monitoring apparatus. When a memory access request of the computer system is located in the storage (which may be internal storage space, and may also be an externally connected storage) on the memory monitoring apparatus, the request is forwarded to the storage on the memory monitoring apparatus. When the memory access request of the computer system is located in a main memory of the computer system, the main memory of the computer system processes the memory access request. By using this manner, the memory monitoring apparatus may map the storage on the memory monitoring apparatus to the address space of the computer system, so that the computer system directly operates the storage on the memory monitoring apparatus by using an ordinary read or write instruction, including writing the process information to the storage on the memory monitoring apparatus; and the memory monitoring apparatus may directly obtain the process information from the storage on the memory monitoring apparatus.

Because during running of the computer system, it is possible that the process information is updated, for example, a page is allocated or a page is released, the process information further includes a process update operation by the computer system.

103: Generate monitoring information according to the memory unit access information and the process information.

The monitoring information includes frequency at which the current running process of the computer system accesses each memory unit.

The memory monitoring apparatus sorts out the number of access times of each memory unit of the computer system obtained in step 101 and the process information obtained in step 102, and classifies the memory unit access information into each process of the computer system to obtain the frequency at which the current running process of the computer system accesses each memory unit, so that the computer system learns memory units accessed most frequently and least frequently by each process thereof.

Further, the monitoring information includes statistics information. The statistics information is obtained by the memory monitoring apparatus by classifying the number of access times of each memory unit of the computer system into the number of access times of one or more of a Bank, a Rank, a memory module, and a memory channel. The statistics information includes the number of access times of one or more of the Bank, the Rank, the memory module, and the memory channel. The Bank and the Rank are terminologies in the field of computers.

104: Feed the monitoring information back to the computer system, so that the computer system performs memory management according to the monitoring information.

In the embodiment of the present invention, the monitoring information may be fed back to the computer system in an active feedback manner, and in this case, after generating the monitoring information, the memory monitoring apparatus may store the monitoring information into a buffer created in advance in the computer system, and update a memory status bit of the computer system, so that the computer system learns that the monitoring information has been stored into the buffer. The memory status bit may be agreed on by the memory monitoring apparatus and the computer system in advance. For example, it may be agreed that when a value of the memory status bit is 1, it indicates that the monitoring information has been written to the buffer. After the computer system reads the monitoring information from the buffer, the memory status bit is reset, so that the memory status bit is updated when the memory monitoring apparatus writes the monitoring information next time. For another example, it may be agreed that each time the memory status bit is updated (for example, the value of the memory status bit changes from 0 to 1, or from 1 to 0), it indicates that the monitoring information has been written to the buffer, and in this case, after the computer system reads the monitoring information from the buffer, it is unnecessary to perform a reset operation on the memory status bit.

In the embodiment of the present invention, the monitoring information may also be fed back to the computer system in a passive feedback manner, and in this case, after generating the monitoring information, the memory monitoring apparatus may first store the monitoring information into the storage on the memory monitoring apparatus, and feed the stored monitoring information back to the computer system only when receiving, from the computer system, a command to obtain the monitoring information.

In the embodiment of the present invention, the memory monitoring apparatus may feed the monitoring information back to the computer system by using a peripheral bus (for example, an Ethernet bus or a Peripheral Component Interconnect Express (PCIe) bus) interconnected with the computer system. Certainly, if the memory monitoring apparatus is connected to the memory bus of the computer system in series, because the memory monitoring apparatus may map the storage on the memory monitoring apparatus to the address space of the computer system, the computer system may also directly perform an operation of reading the monitoring information from the memory monitoring apparatus.

Further, if the memory unit access information obtained in step 101 includes the reuse distance of each memory unit of the computer system, the memory monitoring apparatus may further feed the obtained reuse distance of each memory unit of the computer system back to the computer system, so that the computer system performs memory management by using the reuse distance. For feeding the obtained reuse distance of each memory unit of the computer system back to the computer system, reference may be made to the manner for feeding the monitoring information back to the computer system, which is not described again herein.

It should be noted that a memory unit in the embodiment of the present invention refers to a continuous address space in a memory, and in a different memory management manner, a continuous address space in a memory may be indicated by another terminology, for example, when a memory management manner is a "paging manner", a continuous address space in a memory is also referred to as a "page", and when a memory management manner is a "segmentation manner", a continuous address space in a memory is also referred to as a "segment".

It can be seen from the foregoing that, in the embodiment of the present invention, memory unit access information and process information of a computer system are obtained to extract frequency at which a current running process of the computer system accesses each memory unit, and monitoring information including the frequency at which the current running process of the computer system accesses each memory unit is generated and fed back to the computer system, so that the computer system can perform memory management according to the frequency at which the process accesses the memory unit and which is included in the monitoring information, and execution efficiency of the computer system can be greatly improved.

Figure 2:
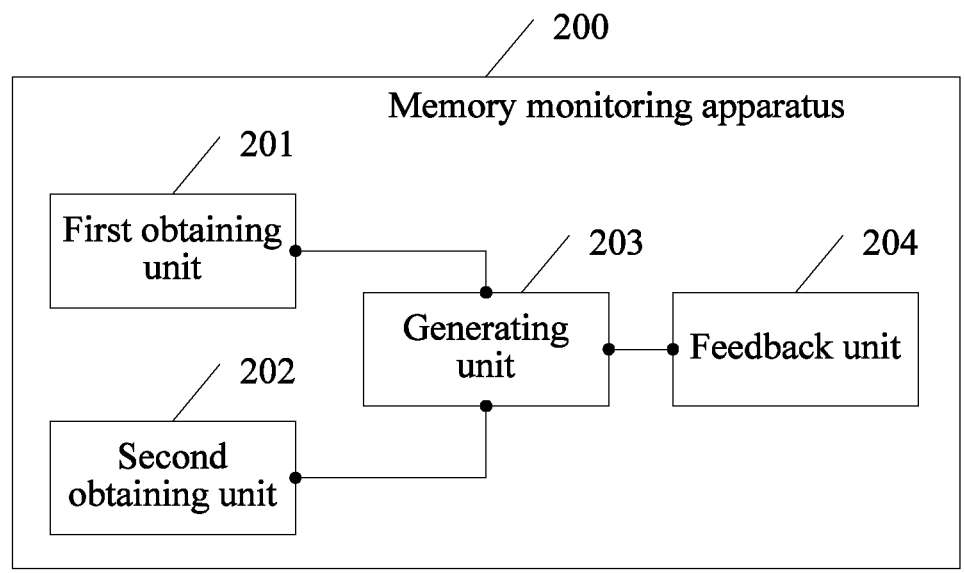
FIG. 2 is a schematic structural diagram of an embodiment of a memory monitoring apparatus provided by the embodiments of the present invention.

A memory monitoring apparatus in an embodiment of the present invention is described in the following. Referring to FIG. 2, a memory monitoring apparatus 200 in an embodiment of the present invention includes a first obtaining unit 201, a second obtaining unit 202, a generating unit 203, and a feedback unit 204.

The first obtaining unit 201 is configured to obtain memory unit access information of a computer system, where the memory unit access information includes the number of access times of each memory unit of the computer system.

Further, the memory unit access information obtained by the first obtaining unit 201 may include a reuse distance of each memory unit of the computer system.

In the embodiment of the present invention, two counters are maintained for each memory unit, where one counter is configured to calculate the number of access times of the memory unit (for the convenience of distinction, this counter is referred to as a first counter), and the other counter is configured to calculate a reuse distance of the memory unit (for the convenience of distinction, this counter is referred to as a second counter). For the number of access times of a memory unit, when an access address belongs to the memory unit, the first counter maintained for the memory unit is incremented by 1; therefore, the number of access times of the memory unit is a value of the first counter maintained for the memory unit. The reuse distance refers to the number of access times of another memory unit within an interval between two accesses to a same memory unit. When an access address does not belong to the memory unit, the second counter maintained for the memory unit is incremented by 1; and when an access address belongs to the memory unit, the second counter is reset, where a value before the reset is a reuse distance of the memory unit.

In the embodiment of the present invention, the first obtaining unit 201 may obtain the memory unit access information of the computer system by listening on a memory bus of the computer system, and certainly, the first obtaining unit 201 may also obtain the memory unit access information of the computer system from another external device, which is not limited herein. That the first obtaining unit 201 obtains the memory unit access information of the computer system by listening on the memory bus of the computer system may be implemented in the following two manners. In one implementation manner, the memory monitoring apparatus 200 is connected to an extended command and address bus of the memory bus, so that the first obtaining unit 201 can perform bypass listening on the command and address bus to obtain an access situation of each memory unit (for example, the number of access times and the reuse distance of each memory unit) of the computer system, so as to obtain the memory unit access information of the computer system. In another implementation manner, the first obtaining unit 201 obtains the memory unit access information of the computer system in a non-bypass-listening manner, that is, the memory monitoring apparatus 200 is connected to the memory bus in series, and then all memory access operations of the computer system go through the memory monitoring apparatus 200; therefore, the memory monitoring apparatus 200 can collect statistics about information such as the number of access times and the reuse distance of each memory unit by using the first obtaining unit 201, so as to obtain the memory unit access information of the computer system.

The second obtaining unit 202 is configured to obtain process information of the computer system, where the process information includes information about a mapping relationship between a virtual address and a physical address of a current running process of the computer system.

In an implementation manner, the computer system may encode the process information to generate a special memory access address, where the special memory access address cannot be accessed by an application program, but can only be recognized and accessed by the memory monitoring apparatus 200. The second obtaining unit 202 includes a detection unit and a decoding and obtaining unit. The detection unit is configured to detect a special memory access address of the computer system; and the decoding and obtaining unit is configured to decode the special memory access address detected by the detection unit to obtain the process information of the computer system. For example, the computer system and the memory monitoring apparatus 200 may agree that some bits (which are assumed to be the first bit and the second bit) of a memory access address are used as flag bits of the special memory access address, and agree on a specific identifier. The computer system encodes the process information to generate the special memory access address, where the first bit and the second bit of the special memory access address are the specific identifier, and remaining bits are encoded data obtained after the computer system encodes the process information. The detection unit detects a memory access address of the computer system in real time, and when detecting that the first bit and the second bit of a memory access address are the specific identifier, determines that the memory access address is the special memory access address including the encoded data of the process information; and the decoding and obtaining unit decodes the detected special memory access address to obtain the process information.

In another implementation manner, if the memory monitoring apparatus 200 is connected to the memory bus of the computer system in series, the memory monitoring apparatus 200 may allocate a part of an address space of the computer system to a storage (which may be an internal storage space, and may also be an externally connected storage) on the memory monitoring apparatus 200. When a memory access request of the computer system is located in the storage on the memory monitoring apparatus 200, the request is forwarded to the storage on the memory monitoring apparatus 200. When the memory access request of the computer system is located in a main memory of the computer system, the main memory of the computer system processes the memory access request. By using this manner, the memory monitoring apparatus 200 may map the storage on the memory monitoring apparatus 200 to the address space of the computer system, so that the computer system directly operates the storage on the memory monitoring apparatus 200 by using an ordinary read or write instruction, including writing the process information to the storage on the memory monitoring apparatus 200; and the second obtaining unit 202 may directly obtain the process information from the storage on the memory monitoring apparatus 200.

Because during running of the computer system, a process may be updated, for example, a process is started or a process is ended, the process information further includes a process update operation by the computer system.

The generating unit 203 is configured to generate monitoring information according to the memory unit access information obtained by the first obtaining unit 201 and the process information obtained by the second obtaining unit 202, where the monitoring information includes frequency at which the current running process of the computer system accesses each memory unit.

Further, the monitoring information includes statistics information, and the generating unit 203 is configured to generate, according to the number of access times of each memory unit of the computer system obtained by the first obtaining unit 201 and the process information obtained by the second obtaining unit 202, the frequency at which the current running process of the computer system accesses each memory unit; and classify the number of access times of each memory unit of the computer system obtained by the first obtaining unit 201 into the number of access times of one or more of a Bank, a Rank, a memory module, and a memory channel, so as to obtain the statistics information, where the statistics information includes the number of access times of one or more of the Bank, the Rank, the memory module, and the memory channel. The Bank and the Rank are terminologies in the field of computers.

The feedback unit 204 is configured to feed the monitoring information generated by the generating unit 203 back to the computer system, so that the computer system performs memory management according to the monitoring information.

In an implementation manner, in the embodiment of the present invention, the monitoring information may be fed back to the computer system in an active feedback manner. The feedback unit 204 includes a buffer unit and an update unit, where the buffer unit is configured to store the monitoring information generated by the generating unit 203 into a buffer created in advance in the computer system; and the update unit is configured to update a memory status bit of the computer system, so that the computer system learns that the monitoring information has been stored into the buffer. The memory status bit may be agreed on by the memory monitoring apparatus 200 and the computer system in advance. For example, it may be agreed that when a value of the memory status bit is 1, it indicates that the monitoring information has been written to the buffer. After the computer system reads the monitoring information from the buffer, the memory status bit is reset, so that the update unit updates the memory status bit of the computer system when the buffer unit writes the monitoring information next time. For another example, it may be agreed that each time the memory status bit is updated (for example, the value of the memory status bit changes from 0 to 1, or from 1 to 0), it indicates that the monitoring information has been written to the buffer, and in this case, after the computer system reads the monitoring information from the buffer, it is unnecessary to perform a reset operation on the memory status bit.

In the embodiment of the present invention, the monitoring information may also be fed back to the computer system in a passive feedback manner, and in this case, after generating the monitoring information, the memory monitoring apparatus 200 may first store the monitoring information into the storage on the memory monitoring apparatus 200. The memory monitoring apparatus 200 further includes a receiving unit configured to receive, from the computer system, a command to obtain the monitoring information; and the feedback unit 204 feeds the stored monitoring information back to the computer system only when the receiving unit receives, from the computer system, the command to obtain the monitoring information.

In the embodiment of the present invention, the feedback unit 204 may feed the monitoring information back to the computer system by using a peripheral bus (for example, an Ethernet bus or a PCIe bus) interconnected with the computer system. Certainly, if the memory monitoring apparatus 200 is connected to the memory bus of the computer system in series, because the memory monitoring apparatus 200 may map the storage on the memory monitoring apparatus 200 to the address space of the computer system, the computer system may also directly read the monitoring information from the memory monitoring apparatus 200.

Further, if the memory unit access information obtained by the first obtaining unit 201 includes the reuse distance of each memory unit of the computer system, the feedback unit 204 is further configured to feed the reuse distance of each memory unit of the computer system obtained by the first obtaining unit 201 back to the computer system, so that the computer system performs memory management by using the reuse distance. For feeding, by the feedback unit 204, the obtained reuse distance of each memory unit of the computer system back to the computer system, reference may be made to the manner for feeding the monitoring information back to the computer system, which is not described again herein.

It should be noted that a memory unit in the embodiment of the present invention refers to a continuous address space in a memory, and in a different memory management manners, a continuous address space in a memory may be indicated by another terminology, for example, when a memory management manner is a "paging manner", a continuous address space in a memory is also referred to as a "page", and when a memory management manner is a "segmentation manner", a continuous address space in a memory is also referred to as a "segment".

It should be noted that the memory monitoring apparatus 200 in the embodiment of the present invention, like the memory monitoring apparatus in the foregoing method embodiment, may be configured to implement all technical solutions in the foregoing method embodiments. Functions of all function modules of the memory monitoring apparatus 200 may be specifically implemented according to the method in the foregoing method embodiments, and reference may be made to a related description in the foregoing embodiment for a specific implementation process of the function module, which is not described again herein.

It can be seen from the foregoing that, in the embodiment of the present invention, memory unit access information and process information of a computer system are obtained to extract frequency at which a current running process of the computer system accesses each memory unit, and monitoring information including the frequency at which the current running process of the computer system accesses each memory unit is generated and fed back to the computer system, so that the computer system can perform memory management according to the frequency at which the process accesses the memory unit and which is included in the monitoring information, and execution efficiency of the computer system can be greatly improved.

An embodiment of the present invention further provides a computer storage medium, where a program is stored in the computer storage medium, and the program performs a part of or all steps recorded in the method embodiment.

Figure 3:
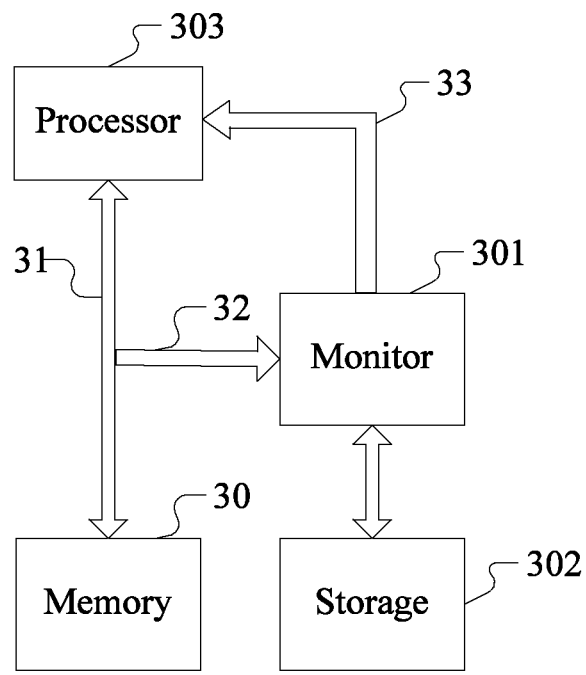
FIG. 3 is a schematic structural diagram of another embodiment of the memory monitoring apparatus provided by the embodiments of the present invention.

A memory monitoring apparatus in the present invention is described by using an example in which a monitor 301 is used as the memory monitoring apparatus to perform bypass listening on a command and address bus of a computer system. Refer to FIG. 3, which includes the monitor 301, a storage 302, and a processor 303 (where the processor 303 is controlled by software running on the processor 303 to perform a corresponding function), and it should be noted that the computer system mentioned below includes the storage 302 and the processor 303.

The monitor 301 interconnects with the computer system by using a peripheral bus 33 (where the peripheral bus may be, for example, an Ethernet bus or a PCIe bus), and the processor 303 is connected to a memory 30 of the computer system by using a memory bus 31 of the computer system. The monitor 301 is configured to perform bypass listening on a command and address bus 32 of the memory bus 31 of the computer system to obtain memory unit access information of the computer system, where the memory unit access information includes the number of access times of each memory unit of the computer system.

The monitor 301 is further configured to obtain process information of the computer system, where the process information includes information about a mapping relationship between a virtual address and a physical address of a current running process of the computer system. The processor 303 (which is controlled by software running on the processor 303) encodes the process information to generate a special memory access address, where the special memory access address cannot be accessed by an application program, but can only be recognized and accessed by the monitor 301. When detecting the special memory access address of the computer system, the monitor 301 decodes the special memory access address to obtain the process information of the computer system.

The monitor 301 is further configured to generate monitoring information according to the obtained memory unit access information and the obtained process information, where the monitoring information includes frequency at which the current running process of the computer system accesses each memory unit.

The monitor 301 is further configured to feed the generated monitoring information back to the computer system by using the peripheral bus 33. The monitor 301 may feed the monitoring information back to the computer system in an active feedback manner, that is, the monitor 301 regularly stores the generated monitoring information into a buffer created in advance in the computer system, and updates a memory status bit of the computer system; and the processor 303 (which is controlled by software running on the processor 303) regularly examines the memory status bit of the computer system, and when discovering that the memory status bit of the computer system is updated, obtains the monitoring information from the buffer. Alternatively, the monitor 301 may also feed the monitoring information back to the computer system in a passive feedback manner, that is, after generating the monitoring information, the monitor 301 first stores the monitoring information into the storage 302; the processor 303 (which is controlled by software running on the processor 303) regularly sends a command for obtaining monitoring information to the monitor 301; and when receiving the command, from the processor 303, for obtaining monitoring information, the monitor 301 feeds the monitoring information stored in the storage 302 back to the computer system.

It should be noted that the monitor 301 in the embodiment of the present invention may be a field-programmable gate array (FPGA), or a complex programmable logic device (CPLD), or an application specific integrated circuit (ASIC), and certainly, may also be another type of processor, which is not limited herein.

It should be noted that a memory unit in the embodiment of the present invention refers to a continuous address space in a memory, and in a different memory management manner, a continuous address space in a memory may be indicated by another terminology, for example, when a memory management manner is a "paging manner", a continuous address space in a memory is also referred to as a "page", and when a memory management manner is a "segmentation manner", a continuous address space in a memory is also referred to as a "segment".

It should be noted that the memory monitoring apparatus in the embodiment of the present invention, like the memory monitoring apparatus in the foregoing method embodiment, may be configured to implement all technical solutions in the foregoing method embodiments. Functions of all function modules of the memory monitoring apparatus may be specifically implemented according to the method in the foregoing method embodiments, and reference may be made to a related description in the foregoing embodiment for a specific implementation process of the function module, which is not described again herein.

It can be seen from the foregoing that in the embodiment of the present invention, memory unit access information and process information of a computer system are obtained to extract frequency at which a current running process of the computer system accesses each memory unit, and monitoring information including the frequency at which the current running process of the computer system accesses each memory unit is generated and fed back to the computer system, so that the computer system can perform memory management according to the frequency at which the process accesses the memory unit and which is included in the monitoring information, and execution efficiency of the computer system can be greatly improved.

Figure 4:
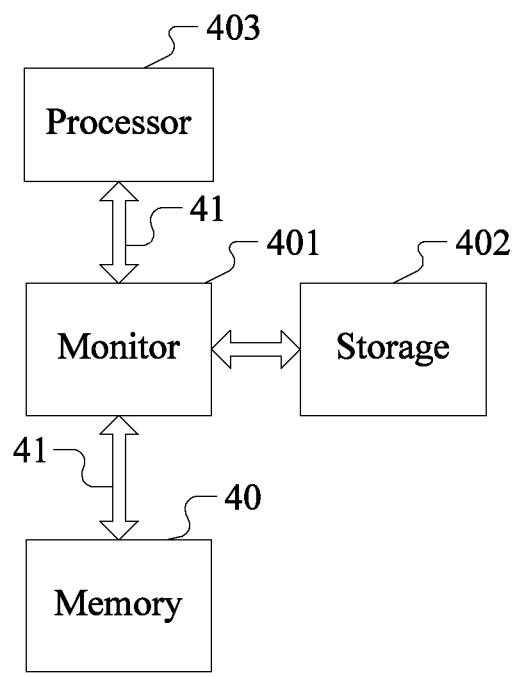
FIG. 4 is a schematic structural diagram of still another embodiment of the memory monitoring apparatus provided by the embodiments of the present invention.

A memory monitoring apparatus in the present invention is described by using an example in which a monitor 401 is used as the memory monitoring apparatus to perform non-bypass-listening on a command and address bus of a computer system. Refer to FIG. 4, which includes the monitor 401, a storage 402, and a processor 403, where the computer system mentioned in the following includes the storage 402 and the processor 403, and the processor 403 is controlled by software running on the processor 403 to perform a corresponding function.

The monitor 401 is connected to a memory bus 41 of the computer system in series; and because the memory bus 41 is connected to a memory 40 of the computer system, all memory access operations of the computer system go through the monitor 401, and the monitor 401 can collect statistics about information such as the number of access times and a reuse distance of each memory unit of the computer system, so as to obtain memory unit access information of the computer system.

The monitor 401 is further configured to obtain process information of the computer system, where the process information includes information about a mapping relationship between a virtual address and a physical address of a current running process of the computer system. The monitor 401 allocates a part of an address space of the computer system to the storage 402. When a memory access request of the computer system is located in the storage 402, the request is forwarded to the storage 402. When the memory access request of the computer system is located in a main memory of the computer system, the main memory of the computer system processes the memory access request. By using this manner, the monitor 401 may map the storage 402 to the address space of the computer system, so that the computer system directly operates the storage 402 by using an ordinary read or write instruction, including writing, by the processor 403 (where the processor 403 is controlled by a running software module), the process information to the storage 402; and the monitor 401 may directly obtain the process information from the storage 402.

The monitor 401 is further configured to generate monitoring information according to the obtained memory unit access information and the obtained process information, where the monitoring information includes frequency at which the current running process of the computer system accesses each memory unit.

The monitor 401 is further configured to feed the generated monitoring information back to the computer system. Because the monitor 401 maps the storage 402 to the address space of the computer system, the computer system can directly read data from the storage 402. The monitor 401 may regularly store the generated monitoring information into the storage 402, and the processor 403 (where the processor 403 is controlled by software running on the processor 403) regularly reads the monitoring information from the storage 402.

It should be noted that the monitor 401 in the embodiment of the present invention may be an FPGA, or a CPLD, or an ASIC, and certainly, may also be another type of processor, which is not limited herein.

It should be noted that a memory unit in the embodiment of the present invention refers to a continuous address space in a memory, and in a different memory management manner, a continuous address space in a memory may be indicated by another terminology, for example, when a memory management manner is a "paging manner", a continuous address space in a memory is also referred to as a "page", and when a memory management manner is a "segmentation manner", a continuous address space in a memory is also referred to as a "segment".

It should be noted that the memory monitoring apparatus in the embodiment of the present invention, like the memory monitoring apparatus in the foregoing method embodiment, may be configured to implement all technical solutions in the foregoing method embodiments. Functions of all function modules of the memory monitoring apparatus may be specifically implemented according to the method in the foregoing method embodiments, and reference may be made to a related description in the foregoing embodiment for a specific implementation process of the function module, which is not described again herein.

It can be seen from the foregoing that in the embodiment of the present invention, memory unit access information and process information of a computer system are obtained to extract frequency at which a current running process of the computer system accesses each memory unit, and monitoring information including the frequency at which the current running process of the computer system accesses each memory unit is generated and fed back to the computer system, so that the computer system can perform memory management according to the frequency at which the process accesses the memory unit and which is included in the monitoring information, and execution efficiency of the computer system can be greatly improved.

Figure 5:
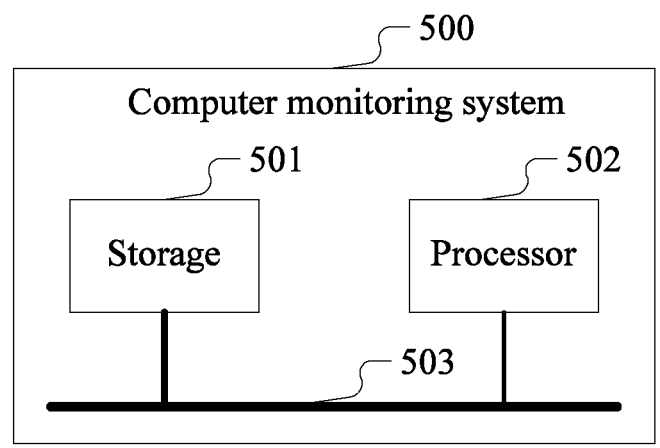
FIG. 5 is a schematic structural diagram of an embodiment of a computer monitoring system provided by the embodiments of the present invention.

A computer monitoring system in an embodiment of the present invention is described in the following. Referring to FIG. 5, a computer monitoring system 500 in the embodiment of the present invention includes at least one storage 501 and at least one processor 502, where the at least one processor 502 includes a processor responsible for a service function (which is referred to as a service processor 502 for short in the following) and a processor responsible for a monitoring function (which is hereinafter referred to as a monitoring processor 502 in short). The computer system mentioned in the following includes the storage 501 and the service processor 502. In the embodiment of the present invention, the storage 501 and the processor 502 may be connected through a bus or in another manner, and as shown in FIG. 5, connection through a bus 503 is used as an example.

The method disclosed in the foregoing embodiment of the present invention is applicable to the monitoring processor 502, or in other words, is implemented by the monitoring processor 502. The monitoring processor 502 may be an integrated circuit chip, and has a capability of executing instructions and data, and a capability of signal processing. In an implementation process, steps in the method may be completed by a hardware integrated logic circuit or software instructions in the monitoring processor 502. The monitoring processor 502 may be a general-purpose processor (for example, central processing unit (CPU)), a digital signal processor (DSP), an ASIC, an FPGA or other programmable logic devices, a discrete gate or transistor logic device, or a discrete hardware component, and may implement or perform methods, steps, and logic block diagrams disclosed in the embodiments of the present invention. The general-purpose processor may be a micro-processor, or the processor may also be any conventional processor or the like. The steps in the method disclosed with reference to the embodiment of the present invention may be directly performed by a hardware processor, or may be performed by a combination of hardware and software modules in a processor. The software module may be located in a mature storage medium in the art, such as a random access memory, a flash memory, a read-only memory, a programmable read-only memory, an electrically erasable programmable memory, or a register. The storage medium is located in the storage 501; and the processor 502 reads information in the storage 501, and completes steps of the foregoing method in combination with hardware of the processor 502.

The storage 501 may be a static random access memory (SRAM), and may also be a dynamic random access memory (DRAM), or another storage, such as a Flash memory, which is not limited herein.

The monitoring processor 502 performs the following steps: obtaining memory unit access information of a computer system, where the memory unit access information includes the number of access times of each memory unit of the computer system, and the memory unit access information may further include a reuse distance of each memory unit of the computer system; obtaining process information of the computer system, where the process information includes information about a mapping relationship between a virtual address and a physical address of a current running process of the computer system; generating monitoring information according to the memory unit access information and the process information, where the monitoring information includes frequency at which the current running process of the computer system accesses each memory unit; and feeding the monitoring information back to the computer system, so that the computer system performs memory management according to the monitoring information.

In the embodiment of the present invention, the monitoring processor 502 may obtain the memory unit access information of the computer system by listening on a memory bus of the computer system, and certainly, the memory unit access information of the computer system may also be obtained by another external device and sent to the monitoring processor 502, which is not limited herein. That the monitoring processor 502 obtains the memory unit access information of the computer system by listening on the memory bus of the computer system may be implemented in the following two manners. In one implementation manner, the monitoring processor 502 is connected to an extended command and address bus of the memory bus of the computer system, so that the monitoring processor 502 can perform bypass listening on the command and address bus to obtain an access situation of each memory unit (for example, the number of access times and the reuse distance of each memory unit) of the computer system, so as to obtain the memory unit access information of the computer system. In another implementation manner, the memory unit access information of the computer system is obtained in a non-bypass-listening manner, that is, the monitoring processor 502 is connected to the memory bus in series, and then all memory access operations of the computer system go through the monitoring processor 502; therefore, the monitoring processor 502 can collect statistics about information such as the number of access times and the reuse distance of each memory unit, so as to obtain the memory unit access information of the computer system.

In an implementation manner, the computer system may encode the process information to generate a special memory access address, where the special memory access address cannot be accessed by an application program, but can only be recognized and accessed by the monitoring processor 502. For example, the computer system and the monitoring processor 502 may agree that some bits (which are assumed to be the first bit and the second bit) of a memory access address are used as flag bits of the special memory access address, and agree on a specific identifier. The computer system encodes the process information to generate the special memory access address, where the first bit and the second bit of the special memory access address are the specific identifier, and remaining bits are encoded data obtained after the computer system encodes the process information. The monitoring processor 502 detects a memory access address of the computer system in real time, and when detecting that the first bit and the second bit of a memory access address are the specific identifier, determines that the memory access address is the special memory access address including the encoded data of the process information; and the monitoring processor 502 decodes the detected special memory access address to obtain the process information.

In another implementation manner, if the monitoring processor 502 is connected to the memory bus of the computer system in series, the monitoring processor 502 may allocate a part of an address space of the computer system to the storage 501. When a memory access request of the computer system is located in the storage 501, the request is forwarded to the storage 501 by using the bus 503. When the memory access request of the computer system is located in a main memory of the computer system, the main memory of the computer system processes the memory access request. By using this manner, the monitoring processor 502 may map the storage 501 to the address space of the computer system, so that the computer system directly operates the storage 501 by using an ordinary read or write instruction, including writing the process information to the storage 501; and the monitoring processor 502 may directly obtain the process information from the storage 501.

Because during running of the computer system, a process may be updated, for example, a process is started or a process is ended, the process information further includes a process update operation by the computer system.

Further, the monitoring information further includes statistics information. The monitoring processor 502 is configured to classify the number of access times of each memory unit of the computer system into the number of access times of one or more of a Bank, a Rank, a memory module, and a memory channel, so as to obtain the statistics information. The statistics information includes the number of access times of one or more of the Bank, the Rank, the memory module, and the memory channel.

In the embodiment of the present invention, the monitoring processor 502 may feed the monitoring information back to the computer system in an active feedback manner, and in this case, after generating the monitoring information, the monitoring processor 502 may store the monitoring information into a buffer created in advance in the computer system, and update a memory status bit of the computer system, so that the computer system learns that the monitoring information has been stored into the buffer. The memory status bit may be agreed on by the monitoring processor 502 and the computer system in advance. For example, it may be agreed that when a value of the memory status bit is 1, it indicates that the monitoring information has been written to the buffer. After the computer system reads the monitoring information from the buffer, the memory status bit is reset, so that the memory status bit is updated when the monitoring processor 502 writes the monitoring information next time. For another example, it may be agreed that each time the memory status bit is updated (for example, the value of the memory status bit changes from 0 to 1, or from 1 to 0), it indicates that the monitoring information has been written to the buffer, and in this case, after the computer system reads the monitoring information from the buffer, it is unnecessary to perform a reset operation on the memory status bit.

In the embodiment of the present invention, the monitoring processor 502 may also feed the monitoring information back to the computer system in a passive feedback manner, and in this case, after generating the monitoring information, the monitoring processor 502 may first store the monitoring information into a storage on the monitoring processor 502, and feed the stored monitoring information back to the computer system only when receiving, from the computer system, a command to obtain the monitoring information.

In the embodiment of the present invention, the monitoring processor 502 may feed the monitoring information back to the computer system by using a peripheral bus (for example, an Ethernet bus or a PCIe bus) interconnected with the computer system. Certainly, if the monitoring processor 502 is connected to the memory bus of the computer system in series, because the monitoring processor 502 may map the storage 501 to the address space of the computer system, the computer system may also directly perform an operation of reading the monitoring information from the monitoring processor 502.

It should be noted that a memory unit in the embodiment of the present invention refers to a continuous address space in a memory, and in a different memory management manner, a continuous address space in a memory may be indicated by another terminology, for example, when a memory management manner is a "paging manner", a continuous address space in a memory is also referred to as a "page", and when a memory management manner is a "segmentation manner", a continuous address space in a memory is also referred to as a "segment".

It should be noted that the monitoring processor 502 in the embodiment of the present invention, like the memory monitoring apparatus in the foregoing method embodiment, may be configured to implement all technical solutions in the foregoing method embodiments. Functions of all function modules of the monitoring processor 502 may be specifically implemented according to the method in the foregoing method embodiments, and reference may be made to a related description in the foregoing embodiment for a specific implementation process of the function module, which is not described again herein.

It can be seen from the foregoing that in the embodiment of the present invention, memory unit access information and process information of a computer system are obtained to extract frequency at which a current running process of the computer system accesses each memory unit, and monitoring information including the frequency at which the current running process of the computer system accesses each memory unit is generated and fed back to the computer system, so that the computer system can perform memory management according to the frequency at which the process accesses the memory unit and which is included in the monitoring information, and execution efficiency of the computer system can be greatly improved.

It should be noted that, for brief description, the foregoing method embodiments are represented as series of actions. However, a person skilled in the art should appreciate that the present invention is not limited to the described order of actions, because according to the present invention, some steps may be performed in other order or simultaneously. In addition, a person skilled in the art should also understand that the embodiments described in this specification are all exemplary embodiments, and the involved actions and modules are not necessarily mandatory to the present invention.

In the foregoing embodiments, the descriptions of the embodiments have respective focuses. For a part that is not described in detail in one embodiment, reference may be made to related descriptions in other embodiments.

A person of ordinary skill in the art may understand that all or a part of the steps of the methods in the embodiments may be implemented by a program instructing relevant hardware. The program may be stored in a computer readable storage medium. The storage medium may include a read-only memory, a random-access memory, a magnetic disk, or an optical disc.

The memory monitoring method and the related apparatus provided in the present invention are described in detail in the foregoing; however, a person of ordinary skill in the art may make modifications to the specific implementation manners and application scope according to the idea of the embodiments of the present invention. The content of this specification should not be construed as a limitation on the present invention.

What is claimed is:

1. A memory monitoring method performed by a monitor in a computer system, comprising:
   listening, with the monitor separately coupled to a central processing unit (CPU), on a memory bus of the computer system to obtain memory unit access information of the computer system, wherein the memory unit access information comprises a number of access times of each memory unit of the computer system;
   obtaining process information of the computer system, comprising:
      receiving a memory access address from the CPU;
      detecting a special memory access address from the memory access address using a specific identifier of the memory access address, wherein the special memory access address comprises encoded process information of the computer system, and wherein the specific identifier comprises information for identifying a presence of the encoded process information in the memory access address; and
      decoding the detected special memory access address to obtain the process information, wherein the process information comprises information about a mapping relationship between a virtual address and a physical address of a current running process of the computer system, and wherein the physical address of the current running process is a physical address of each memory unit accessed by the current running process;
   generating monitoring information according to the memory unit access information and the process information, wherein the monitoring information comprises a frequency at which the current running process accesses each memory unit; and
   feeding the monitoring information back to the CPU of the computer system, wherein the monitoring information is used by the CPU for managing memory.

2. The method according to claim 1, wherein listening on the memory bus of the computer system comprises performing bypass listening on the memory bus of the computer system.

3. The method according to claim 1, wherein generating the monitoring information according to the memory unit access information and the process information comprises:
   generating, according to the number of access times of each memory unit of the computer system and the process information, the frequency at which the current running process accesses each memory unit; and
   classifying the number of access times of each memory unit of the computer system into a number of access times of one or more of a Bank, a Rank, a memory module, and a memory channel so as to obtain statistics information, wherein the statistics information comprises the number of access times of one or more of the Bank, the Rank, the memory module, and the memory channel.

4. The method according to claim 1, wherein feeding the monitoring information back to the CPU of the computer system comprises:
  storing the monitoring information into a buffer created in advance in the computer system; and
  updating a memory status bit accessed by the CPU to indicate that the monitoring information has been stored into the buffer.

5. The method according to claim 1, wherein feeding the monitoring information back to the CPU of the computer system comprises:
  receiving, from the CPU, a command to obtain the monitoring information; and
  feeding the monitoring information back to the CPU.

6. The method according to claim 1, wherein the memory unit access information further comprises a reuse distance of each memory unit of the computer system, and wherein the method further comprises feeding the reuse distance of each memory unit of the computer system back to the CPU.

7. The method according to claim 1, wherein the specific identifier includes a plurality of flag bits.

8. A computer system, comprising:
  a processor;
  a memory comprising instructions and a plurality of memory units; and
  a monitor separately coupled from the processor, wherein the instructions cause the monitor to be configured to:
    listen on a memory bus of the computer system to obtain memory unit access information of the computer system, wherein the memory unit access information comprises a number of access times of each memory unit of the memory;
    obtain process information of the computer system, comprising:
      receive a memory access address from the processor;
      detect a special memory access address from the memory access address using a specific identifier of the memory access address, wherein the special memory access address comprises encoded process information of the computer system, and wherein the specific identifier comprises information configured to identify a presence of the encoded process information in the memory access address; and
      decode the detected special memory access address to obtain the process information of the computer system, wherein the process information comprises information about a mapping relationship between a virtual address and a physical address of a current running process of the computer system, and wherein the physical address of the current running process is a physical address of each memory unit accessed by the current running process;
    generate monitoring information according to the memory unit access information and the process information, wherein the monitoring information comprises a frequency at which the current running process accesses each memory unit; and
    feed the monitoring information back to the processor of the computer system, wherein the monitoring information is used by the processor for managing memory.

9. The computing system according to claim 8, wherein the instructions cause the monitor to be configured to perform bypass listening on the memory bus of the computer system to obtain the memory unit access information of the computer system.

10. The computing system according to claim 8, wherein the instructions cause the monitor to be configured to:
  generate, according to the number of access times of each memory unit of the memory and the process information, the frequency at which the current running process accesses each memory unit; and
  classify the number of access times of each memory unit of the memory into a number of access times of one or more of a Bank, a Rank, a memory module, and a memory channel, so as to obtain statistics information, wherein the statistics information comprises the number of access times of one or more of the Bank, the Rank, the memory module, and the memory channel.

11. The computing system according to claim 8, wherein the instructions cause the monitor to be configured to:
  store the monitoring information into a buffer created in advance in the computer system; and
  update a memory status bit accessed by the processor to indicate that the monitoring information has been stored into the buffer.

12. The computing system according to claim 8, wherein the instructions cause the monitor to be configured to:
  receive, from the processor, a command to obtain the monitoring information; and
  feed the monitoring information back to the processor.

13. The computing system according to claim 8, wherein the memory unit access information further comprises a reuse distance of each memory unit of the memory, and wherein the monitor is further configured to feed the reuse distance of each memory unit of the memory back to the processor.

14. The computing system according to claim 8, wherein the specific identifier includes a plurality of flag bits.

* * * * *